United States Patent [19]
Cobb

[11] 3,947,012
[45]*Mar. 30, 1976

[54] CUTTING BOARD
[76] Inventor: Westray S. Cobb, 1820 Casselberry Road, Louisville, Ky. 40205
[ * ] Notice: The portion of the term of this patent subsequent to Sept. 24, 1991, has been disclaimed.
[22] Filed: July 30, 1974
[21] Appl. No.: 493,239

Related U.S. Application Data
[63] Continuation-in-part of Ser. No. 336,431, Feb. 28, 1973, Pat. No. 3,837,634.

[52] U.S. Cl....... 269/289 R; 144/315 R; 269/302.1; 428/81; 428/55
[51] Int. Cl.² ............................................ B23Q 3/00
[58] Field of Search ............ 269/289, 302.1; 161/43, 161/162, 168, 261, 270; 144/310 R, 310 B, 315 R; 264/36; 156/94–98

[56] References Cited
UNITED STATES PATENTS

| | | |
|---|---|---|
| 2,018,712 | 10/1935 | Elmendorf ........................ 161/123 |
| 2,831,794 | 4/1958 | Elmendorf ..................... 161/162 X |
| 2,847,733 | 8/1958 | Roy ................................. 161/162 X |
| 2,859,187 | 11/1958 | Ropella .......................... 161/168 X |
| 3,837,634 | 9/1974 | Cobb ................................... 269/289 |

Primary Examiner—Al Lawrence Smith
Assistant Examiner—Robert C. Watson

[57] ABSTRACT

A cutting board comprised of a particle board center having a plurality of veneer strips adhesively secured to the top surface thereof with moisture resistant edge coverings secured to and extending around the outer periphery of the particle board center, the securing adhesive coating the entire top and bottom surface of said particle board to prevent water from penetrating into said board, the overall result being an inexpensive, dimensionally stable cutting board having the appearance of being made from solid pieces of lumber.

8 Claims, 7 Drawing Figures

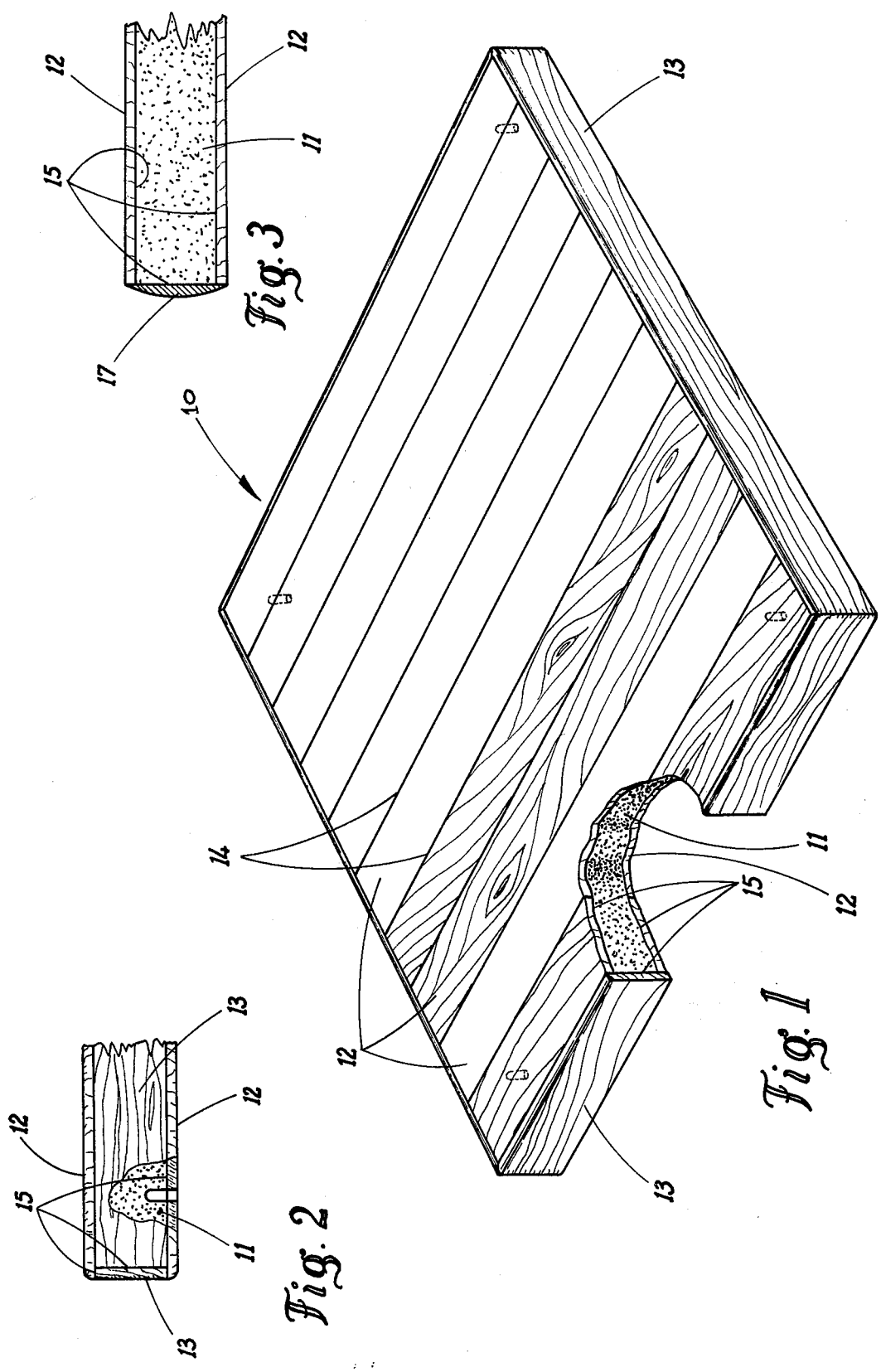

U.S. Patent   March 30, 1976   Sheet 2 of 2   3,947,012
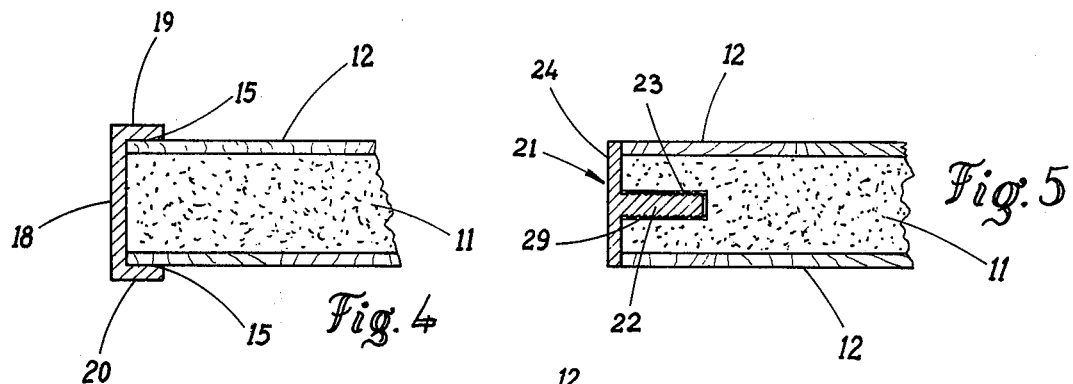
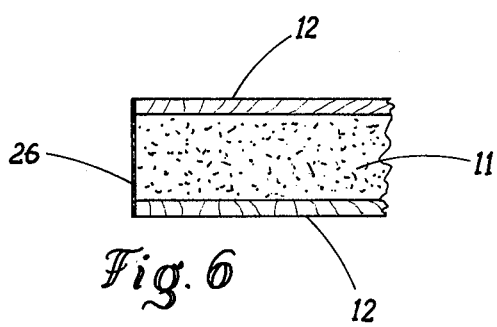
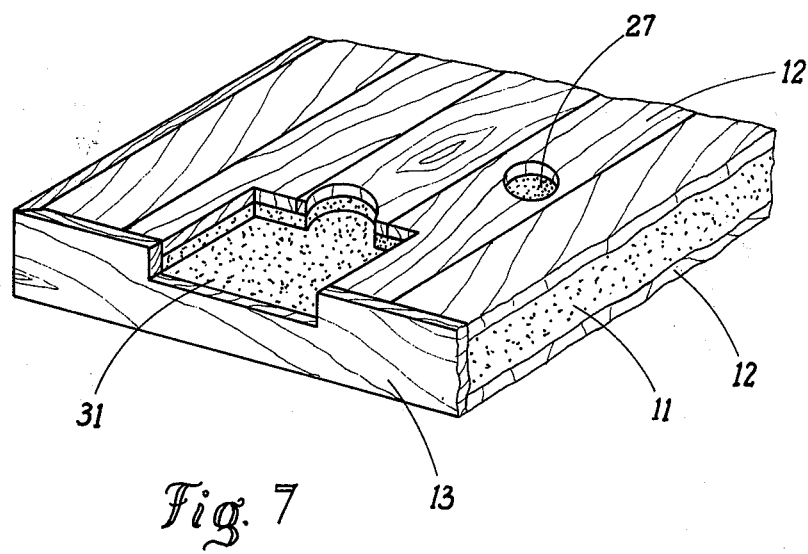

CUTTING BOARD

CROSS REFERENCE TO RELATED APPLICATION

The present invention is a continuation-in-part of co-pending application, Ser. No. 336,431, now U.S. Pat. No. 3,837,634 filed Feb. 28, 1973 by Westray S. Cobb.

BACKGROUND OF THE INVENTION

It has long been a challenge to the wood products industry to fabricate a composite board which would be dimensionally stable and inexpensive for use as a cutting board for use in the household for slicing meats and vegetables and the like. One of the motivating factors behind the attempt to produce such a board is the general scarcity and high cost of lumber. Attempts were made at fabricating such board from various materials such as strips of solid lumber adhesively secured in edge to edge fashion.

Such attempts were generally unsuccessful in that the ratio of surface area of wood adhesively coated to the volume of wood in the lumber strip was so low that the adhesive was incapable of holding fast the lumber strips to prevent them from warping and separating. Veneer strips were dismissed as being unsuitable because a method for keeping the core material stable when exposed to moisture was unknown.

The cutting board of this invention has overcome the prior art problems and has provided an inexpensive, readily constructed, dimensionally stable cutting board capable of withstanding continued use and exposure to moisture and other elements encountered in a household.

SUMMARY OF THE INVENTION

The invention provides a dimensionally stable cutting board suitable for use under conditions of continued exposure to moisture. The invention further provides a cutting board having a particle board core, veneer surfaces and edge coverings along the periphery thereof which gives the appearance of a cutting board made of solid lumber strips.

More specifically, the invention provides a cutting board comprising: a particle board core; a layer of water-resistant adhesive completely coating the top and bottom surfaces of said particle board core; a plurality of relatively thin veneer sheets adhesively attached to one surface of said particle board core in an orderly fashion to provide a durable cutting surface thereon to give said board the appearance of being of solid lumber construction; an opposed surface of said particle board core having at least one veneer sheet adhesively attached thereto; edge coverings disposed along the periphery of said particle board core and in fluid tight communication therewith; the adhesive coating being further characterized in that it forms a water-resistant barrier and attaches said veneer sheets to said core. The present invention has been found to be particularly advantageous where the cutting board is repeatedly exposed to temperatures and humidity above normal room temperature and humidity.

DESCRIPTION OF THE DRAWING

FIG. 1 is an isometric view of the cutting board of this invention, partially cut-away, showing one preferred embodiment;

FIG. 2 is a partial side elevational view of an alternate embodiment of the cutting board of FIG. 1;

FIG. 3 is a partial side elevational view of another alternative embodiment of the cutting board of FIG. 1;

FIG. 4 is a partial side elevational view of another alternative embodiment of the cutting board of FIG. 1;

FIG. 5 is a partial side elevational view of another alternative embodiment of the cutting board of FIG. 1;

FIG. 6 is a partial side elevational view of another alternative embodiment of the cutting board of FIG. 1; and, FIG. 7 is an isometric view of the cutting board, partially cut-away, showing another preferred embodiment.

DESCRIPTION OF THE PREFERRED EMBODIMENT

FIG. 1 shows cutting board 10 comprised of a center core 11 which may be fabricated from any one of a number of man-made construction boards such as fiberboard, composite board, particle board and the like. Center core 11 is generally between ⅜ inch and 1¼ inch in thickness and preferably, as shown, about ¾ inch. Such boards are generally very similar in make-up, being principally waste material such as fibers, shavings, sawdust, waste material around or particulated exclusively for such purpose, and the like. Most preferred is particle board such as that described in detail in U.S. Department of Commerce Commercial Standard CS 236-66, entitled "Mat Formed Wood Particle Board", published by the National Bureau of Standards Forest Products Laboratory — Forest Service, U.S. Department of Agriculture; incorporated herein by reference. Preferably, a resin impregnated particle board described as Type 1, Grade 3 in CS 236-66 of 45 pounds per cubic foot density is used. Adhesively secured by a water resistant adhesive 15 to one side of core 11 is at least one wood sheet or strip 12, a plurality of strips 12 being shown. These sheets or strips are preferably veneer, i.e. they are thin pieces of high quality lumber, which in the instant case is generally sized to a width of from about one inch to three inches and is preferably sized to a width of about two and one quarter inches and a thickness of 1/32 to 1/10 inch, with a thickness of about 1/16 inch being most preferred. Adhesively secured by a water resistant adhesive 15 to the opposed side of said center core 11 is a layer of veneer which may be in the form of pieces of flat strips but is most preferably in the form of a single flat sheet. It should be noted that in the cutting board application for which the present board is intended, the veneer thickness must be at least 1/32 inch in thickness, and must be securely fastened to a support, such as center core 11. Thinner veneer will not work as a cutting board surface since it is subject to being cut through in normal household use. The use of veneer thicker than 1/10 inch becomes prohibitive in cost and is unjustifiable for fabricating a cutting board surface. The veneer strips 12 are adhesively secured by adhesive 15 to the top surface of center core 11 and aligned side by side in parallel relationship to cover the entire surface with their respective grains running in generally the same direction to give the appearance that the board has been fabricated from solid pieces of lumber approximately two and one quarter inches wide and three quarters of an inch thick adhesively secured side by side to each other. The advantages of having a plurality of veneer strips attached to the cutting surface of the board are as follows: Firstly, the division of strips into two and one quarter inch widths allows for greater surface stability when the surface is exposed to water. It is commonly appreciated, that wood does not swell in its grain direction, that is along its length, but does swell in both width and thickness. Thus, restraining the size of the strips and thus the swelling forces on the cutting surface, the dimensional stability thereof is more easily maintained.

The veneer itself should preferably be of a high quality No. 1 grade and should be sanded smooth. However, other commercially available grades would be suitable. The grain and color contrast of the several strips 12 should be such that it creates the appearance of the board being lumber pieces adhesively secured together. Preferably, maple veneer is used. Other suitable woods are cherry, beech, birch, walnut and other hardwoods of similar characteristics.

The surface of the board after laminating the veneer strips thereto is usually coated with an edible oil such as "Stanolin" manufactured and sold by the Standard Oil Company of Kentucky. In the alternative, No. 12 fine mineral oil manufactured by American Oil Company, of Chicago, Ill. can be used. Other suitable oils are the edible low fat polyunsaturated oils commonly noted under the tradenames Crisco, Mazola and the like.

The veneer strips 12 are adhesively attached to the surfaces of center core 11 with edge coverings or strips 13 being adhesively fastened by adhesive 15 to the edges of center core 11 and veneer strips 12. These edge strips may be wood, as exemplified, of the same grade as the veneer strips, or they may be other protective surface material such as vinyl strips, metal strips, polyester strips, decorative paper, and the like. These edge strips 13 are generally of a thickness of at least 1/50 inch. When using strips of material with high abrasion resistance for the edge strips 13, the thickness will generally be less than 1/10 inch. However, for some applications edge strips 13 may be replaced by other water-resistant coverings, such as coatings of vinyl sealers, wax emulsions, moisture resistant adhesives, and the like. The water-resistant coatings are utilized in applications where there is little, if any, concern for abrasion of the edges of the cutting board.

The adhesive material 15 itself can be any one of a number of adhesives which meet the requirements for type I "Waterproof" standard as defined in Standard S-69 of the Hardwood Plywood Manufacturing Association. Examples of suitable adhesives are the urea-formaldehyde resin type adhesives. Specifically, suitable adhesives include such commercially available adhesives as: National Casein Company No. 750 — Liquid Urea Resin; National Casein Company No. F360; and National Casein Company resin No. 600. All three of these adhesives are reinforced with melamine for additional water resistance. Normally, the adhesive used to secure the edge members and sheets of veneer to the particle core is suitable for use in a "hot" process. However, a "cold" process may be used for some applications. One such hot process includes the use of induction heating of the adhesive. It has been found that Type II adhesives as defined in Standard S-69 of HPMA, may also be utilized in the present invention if the cutting board is not subjected or exposed to moisture at relatively high temperatures, those exceeding 170°F. Examples of these adhesives are Southern Resins Company No. 650; National Casein Company No. 750; National Adhesive Company No. 42-3000 and National Adhesive Company No. 42-3010.

FIG. 1 shows one embodiment of the present invention where the edge strips 13 are wood strips with the strips 13 overlaying the edges of the veneer strips 12. Adhesive 15 covers all communicating areas between core 11 and strips 12 with strips 13.

FIG. 2 shows an embodiment of the present invention where the edges of the veneer strips 12 overlay the edges of the wood edge strips 13. Adhesive 15 covers all communicating areas between core 11 and strips 12 with strips 13.

FIG. 3 shows an embodiment of the present invention with edge strips 17 being decorative vinyl moldings of hemispherical configuration overlaying the edges of the veneer strips 12. Adhesive 15 covers all communicating areas between core 11 and strips 12 with strips 17 thereby forming a water-resistant seal between the communicating parts.

FIG. 4 shows an embodiment of the present invention with edge strips 18 being of C-shaped cross-section, the outwardly extending portions 19 and 20 overlaying strips 12 in a substantially tight relation. Adhesive 15 is disposed between portions 19 and 20 with strips 12 to further provide a water-resistant seal between the edge strips 18 and the veneer strips 12. In some applications where the edges will not be exposed to moisture or the fit between the strips 18 and the strips 12 is substantially fluid-tight, adhesive 15 is not necessary.

FIG. 5 shows an embodiment of the present invention with edge strips 21 being of T-shaped cross-section, the leg portion 22 being embedded into a slot in the core 11. The leg portion 22 is provided with outwardly extending finger portions 23 which embed into the periphery of the mating slot 29 in core 11 thereby providing a non-slip fit. Furthermore, the base 24 of the strips 21 abuts the edges of the strips 12 in a substantially fluid tight seal. In such arrangement, a water-resistant adhesive is not necessary unless the cutting board is subjected to a large amount of moisture.

FIG. 6 shows an embodiment of the present invention wherein the exposed edges of veneer strips 12 and core 11 are sealed with a water resistant coating 26. The water resistant coating 26 is usually a vinyl sealer, wax emulsion, or the like. However, the edges are subject to wear. Therefore, usage for a board with this type of edging should be restricted to areas where abrasion is of little concern.

It is also realized that the water sealed integrity of the board may be violated by machining operations thereby exposing the core area. In this embodiment, the area of the exposed core can be sealed with a waterproof or water-resistant sealer such as those described above. FIG. 7 shows an embodiment where an aperture 27 has been machined through the cutting board for receiving, for example, a hose (not shown) therethrough or a portion has been machined out, such as portion 31. In this embodiment, the cutting board even with an exposed core area is substantially protected against moisture.

The composite cutting board of this invention is generally fabricated in the following sequence. The veneer strips 12 are first cut and adhesively attached in edge-to-edge fashion to form a sheet of veneer. This sheet is fabricated with the aid of a veneer splicer. A sheet of veneer is then cut to be adhesively secured to the bottom surface of core 11. Then, both sheets of veneer are adhesively attached to the respective top and bottom surfaces of the center core 11. Edge strips 13 are then secured to the core 11 and strips 12, edge stripe 13 being adapted to overlay the edges of the strips 12. However, if the strips 13 underlay the strips 12, the strips are attached prior to the addition of the strips 12. The composite board is then surface finished and coated with oil. The result is an inexpensive, easily prepared, dimensionally stable, waterproof, cutting board which is readily adaptable for use.

It will be realized that various changes may be made to the specific embodiments shown and described without departing from the principles and spirit of the present invention.

Having thus described the invention what is claimed is:

1. A cutting board comprising: a particle board core; a layer of water-resistant adhesive completely coating the top and bottom surfaces of said particle board core; a plurality of thin veneer sheets adhesively attached to one surface of said particle board core in an orderly fashion to provide a durable cutting surface thereon to give said board the appearance of being of solid lumber construction; an opposed surface of said particle board core having at least one veneer sheet adhesively attached thereto; edge coverings along the periphery of the particle board core and in fluid tight communication therewith; said adhesive coating being further characterized in that it forms a water-resistant barrier and attaches said veneer sheets to said core.

2. The cutting board of claim 1 wherein said veneer sheets are of a thickness in the range of between 1/32 and 1/10 inch.

3. The cutting board of claim 1 wherein said edge coverings are strips of a material having a thickness of at least 1/50 inch.

4. The cutting board of claim 1 wherein said edge coverings are water-resistant coatings.

5. The cutting board of claim 1 wherein said edge coverings are adhesively secured to said veneer sheets and said core, said adhesive being a water-resistant adhesive.

6. The cutting board of claim 1 wherein said edge coverings overlay said veneer sheets.

7. The cutting board of claim 1 wherein said veneer sheets underlay said edge coverings.

8. The cutting board of claim 1 wherein said edge coverings are fixedly attached to the veneer sheets and core in a substantially fluid tight communication.

* * * * *